Sept. 21, 1937. C. H. BRASTED 2,093,413
LAWN EDGER
Filed Nov. 12, 1935
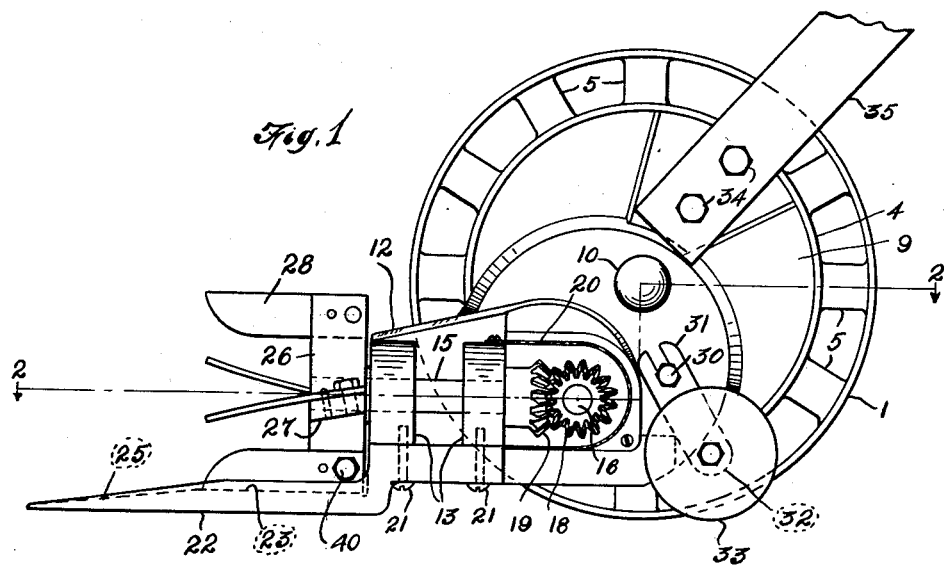
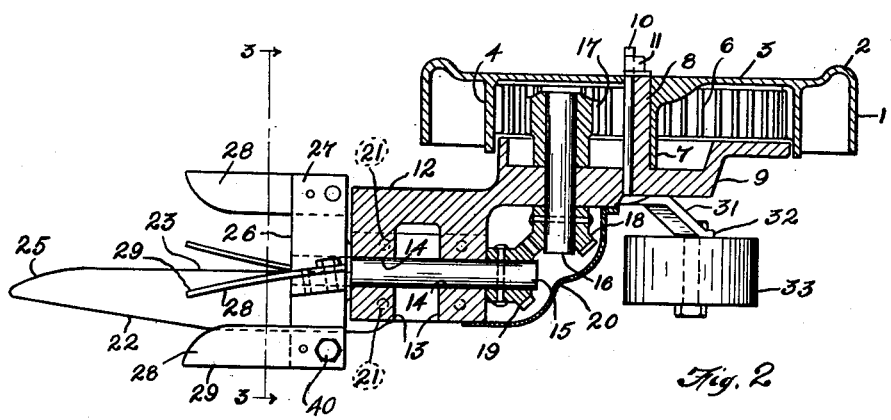
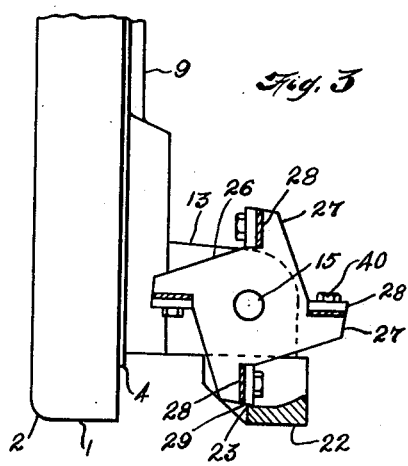
INVENTOR.
Clair H. Brasted
BY
Ray, Oberlin & Ray
ATTORNEYS.

Patented Sept. 21, 1937

2,093,413

UNITED STATES PATENT OFFICE 2,093,413

LAWN EDGER

Clair H. Brasted, East Cleveland, Ohio

Application November 12, 1935, Serial No. 49,353

7 Claims. (Cl. 56—249)

This invention relates, as indicated, to a lawn edger, but has reference more particularly to a device of this character which is especially adapted for trimming the edges of grass lawns adjacent walks, driveways, curbs, flower beds, etc.

A primary object of the invention is to provide a device of this character which, when in operation or use, will simulate to a certain extent the action of a pair of hand shears.

Other objects of the invention are to provide a device of this character which is of rugged construction, consists of a minimum number of easily manufactured parts, and which can be economically made and sold.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a side view of the lawn edger, with a portion of the handle removed and a portion of the gear housing removed to expose the gears to view; Fig. 2 is a horizontal cross-sectional view of the lawn-edger, taken on a line approximately indicated by the line 2—2 of Fig. 1; and Fig. 3 is a transverse cross-sectional view, taken on the line 3—3 of Fig. 2.

Referring more particularly to the drawing, the lawn edger is shown as comprising a supporting and driving wheel 1, the peripheral surface of which is transversely curved at its outer edge, as at 2 for a purpose to be presently described. The wheel 1 is further provided with a spider or web 3, from the inner surface of which an annular flange 4 extends which is concentric with the wheel 1, is connected to the latter by spokes 5 and is provided on its radially inner surface with gear teeth 6. The web 3 of the wheel is provided with a hub 7, which forms a bearing for a stub shaft 8, which extends, from one side of the disc or plate 9. The disc or plate 9 forms a support for the attachment of various parts of the lawn edger which will be presently described and also serves as a closure for preventing access of dirt, grass, etc. to the gear teeth 6. It is maintained in assembled relation with the wheel 1 by means of a bolt 10 and nut 11.

The disc 9 is provided on its outer surface with a forwardly extending extension 12. which is formed integrally with the disc and has extending laterally therefrom a pair of spaced ears or lugs 13, having aligned openings 14 for the reception of a rotatable shaft or pin 15.

The disc 9 has also journalled therein a shaft or pin 16 provided at its inner end with a spur pinion 17 in mesh with the gear teeth 6 and at its outer end with a bevel pinion 18, which meshes with a similar bevel pinion 19 on one end of the shaft 15. The pinions 18 and 19 are normally enclosed as by means of a housing 20 of sheet metal or the like whereby access of dirt and grass to these gears is avoided.

Secured to the lugs 13, as by means of screws 21 is a stationary blade 22 which extends forwardly of the wheel 1 and lies in a plane substantially tangential to the bottom of said wheel. The blade 22 has a rectilinear cutting edge 23 which extends in the normal direction of movement of the lawn edger, and the forward portion of the blade is tapered both longitudinally and transversely so as to provide an edge 25 adapted to lift and cause to stand more or less erect blades of grass at the edge of a lawn.

Secured to the forward end of the shaft 15 is a carrier 26 having a plurality of circumferentially spaced lugs or ears 27, to each of which is secured as by means of a screw 40 a spiral blade 28 having a cutting edge 29. The cutting edge 29 of each blade is in turn adapted to cooperate with the edge 23 of the blade 22 to cut the grass which is caused to stand erect by the blade 22 and thereafter enters the space between the cutting edges 23 and 29. It will be noted that the blades 28 are rotatable about the axis of the shaft 15, and that this axis is parallel with the cutting edge 23 of the blade 22 and lies in a vertical plane which includes the cutting edge 23. It will be further noted that the axis of the shaft 15 extends in the direction in which the lawn edger is normally propelled along the ground. Each blade, it will be noted, extends forwardly from the lug to which it is secured, and the forward ends of the blades are not in any way connected with each other or to any supporting member. Consequently, there is nothing to obstruct the passage of the blades of grass to be cut into the openings or spaces defined by the stationary and rotatable blades. The blades 22 and 28 are preferably made of hardened tool steel.

Adjustably secured to the disc 9, as by means of a screw 30 is a member 31 which extends rearwardly and downwardly and is provided with an offset portion 32, to which is secured a rotatable wheel 33. This wheel serves as an additional support for the edger and also as a fulcrum for tilting the edger to avoid obstructions which might injure the cutting blades.

The disc 9 has also secured thereto as by screws 34 a handle 35 whereby the edger is propelled along the ground.

The operation of the edger will be partially understood from the foregoing description, but may be briefly described as follows:

The edger is propelled along the ground in such a manner that the wheel 1 rests on the lawn adjacent the edge thereof and the blade 22 slides on the walk or flower bed adjacent the edge of the latter. During this movement the blades 28 are caused to rotate at a considerable speed by means of the gears 6, 17, 18 and 19.

The grass and sod which overhang the edge of the lawn are lifted to a more or less erect position by the blade 22 and this grass and sod is caused to enter between the edges 23 and 29 and is cut thereby.

The wheel 33 not only provides additional support for the edger but acts as a fulcrum to permit the edger to be tilted to some extent to avoid obstructions in the way of the blades.

The curved edge 2 of the wheel 1 permits this wheel to be tilted laterally to some extent so that the blade 22 may be tilted somewhat where this is desirable and also facilitates propelling the edger in a curved path.

Although the edger is shown as provided with four rotatable blades, it will be understood that a greater or smaller number of rotatable blades may be provided.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a lawn edger a stationary cutting blade and a plurality of cutting blades cooperating with the cutting edge of said stationary blade and rotatable about an axis parallel with the direction of normal movement of the edger, said rotatable blades being neither supported nor connected with each other at their forward ends.

2. In a lawn edger, a stationary cutting blade having a cutting edge substantially parallel with the direction of normal movement of the edger, and a plurality of cutting blades cooperating with the cutting edge of said stationary blade and rotatable about an axis substantially parallel with said cutting edge, said rotatable blades being neither supported nor connected with each other at their forward ends.

3. In a lawn edger, a stationary cutting blade having a cutting edge extending in the normal direction of movement of the edger, a blade carrier mounted for rotation about an axis substantially parallel with said cutting edge, and a plurality of cutting blades mounted on said carrier and cooperating with said stationary cutting blade, said rotatable blades being neither supported nor connected with each other at their forward ends.

4. In a lawn edger, a stationary cutting blade having a cutting edge extending in the direction of normal movement of the edger, a blade carrier mounted for rotation about an axis substantially parallel with said cutting edge, and a plurality of cutting blades spaced circumferentially of said carrier and extending forwardly thereof, said last-named blades cooperating with said stationary blade to cut grass and the like when said carrier is rotated, and being neither supported nor connected with each other at their forward ends.

5. In a lawn edger, a stationary cutting blade having a cutting edge extending in the normal direction of movement of the edger, a carrier mounted for rotation about an axis substantially parallel with said cutting edge, and a plurality of spiral blades mounted on said carrier and cooperating with said cutting blade, said spiral blades extending forwardly of said carrier and being supported at their rear ends only.

6. In a lawn edger, a ground-engaging wheel, a disk-like member mounted on said wheel and in opposed relation thereto, said member provided on its outer surface with a forwardly extending extension, a cutting blade secured to said extension, a shaft rotatably journalled in said extension and driven by said wheel, said shaft having its axis parallel with the direction of normal movement of the edger, a blade carrier secured to the forward end of said shaft, and a plurality of cutting blades spaced circumferentially of said carrier and extending forwardly thereof, said last-named blades cooperating with said first-named blade to cut grass and the like when the carrier is rotated.

7. In a lawn edger, a ground-engaging wheel, a disk-like member mounted on said wheel and in opposed relation thereto, said member provided on its outer surface with a forwardly extending extension, a cutting blade secured to said extension and having its cutting edge extending in the direction of normal movement of the edger, said blade lying in a plane substantially tangential to the bottom of said wheel, a shaft rotatably journalled in said extension and driven by said wheel, said shaft having its axis substantially parallel with said cutting edge, a blade carrier secured to the forward end of said shaft, and a plurality of cutting blades spaced circumferentially of said carrier and extending forwardly thereof, said last-named blades cooperating with the edge of said first-named blade to cut grass and the like when the carrier is rotated.

CLAIR H. BRASTED.